United States Patent
Kondo et al.

(10) Patent No.: US 6,707,502 B1
(45) Date of Patent: Mar. 16, 2004

(54) APPARATUS AND METHOD FOR CONVERTING A FIELD FREQUENCY OF A PICTURE SIGNAL

(75) Inventors: Tetsujiro Kondo, Tokyo (JP); Yasushi Tatehira, Kanagawa (JP); Masashi Uchida, Tokyo (JP); Masaaki Hattori, Chiba (JP); Takeshi Miyai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,633

(22) PCT Filed: Apr. 21, 2000

(86) PCT No.: PCT/JP00/02637
§ 371 (c)(1),
(2), (4) Date: Feb. 12, 2001

(87) PCT Pub. No.: WO00/67480
PCT Pub. Date: Nov. 9, 2000

(30) Foreign Application Priority Data

Apr. 28, 1999 (JP) .......................................... 11-121871

(51) Int. Cl.⁷ ................................................ H04N 7/01
(52) U.S. Cl. ...................................... 348/459; 348/443
(58) Field of Search ................................ 348/459, 443, 348/447, 558, 441; 382/298–300

(56) References Cited

U.S. PATENT DOCUMENTS

| | | | | |
|---|---|---|---|---|
| 4,731,651 A | * | 3/1988 | Matsumoto et al. | 358/140 |
| 5,221,966 A | * | 6/1993 | Clayton et al. | 358/140 |
| 5,243,422 A | * | 9/1993 | Owashi et al. | 358/140 |
| 5,784,114 A | * | 7/1998 | Borer et al. | 348/452 |
| 5,852,470 A | | 12/1998 | Kondo et al. | |
| 6,307,560 B1 | * | 10/2001 | Kondo et al. | 345/433 |

FOREIGN PATENT DOCUMENTS

| | | |
|---|---|---|
| JP | 62-35788 | 2/1987 |
| JP | 1-171372 | 7/1989 |
| JP | 5-167991 | 7/1993 |
| JP | 07-030859 | 1/1995 |

OTHER PUBLICATIONS

Patent Abstract of Japan, Publication No. 07–193790, Date of Publication Jul. 28, 1995, entitled "Picture Information Converter".

* cited by examiner

Primary Examiner—Victor R. Kostak
(74) Attorney, Agent, or Firm—Frommer Lawrence & Haug LLP; William S. Frommer; Dennis M. Smid

(57) ABSTRACT

An interlaced input picture signal having a field frequency of 50 Hz is supplied. A class detecting circuit detects a class corresponding to a pattern of a level distribution of input pixels in the vicinity of an output pixel to be generated. A predictive coefficient set corresponding to the class is read from a predictive coefficient memory. Sum-of-product calculating circuits calculate data of an output picture signal using a linear estimating expression of predictive taps (pixels of an input picture signal) and predictive coefficient sets. The sum-of-product calculating circuits output pixel values M and S of an output picture signal having a field frequency of 50 Hz. The pixel values M and S that are output from the sum-of-product calculating circuits are converted into a signal having a frequency of 60 Hz by respective field memories. A selector alternately selects outputs of the field memories and generates an output picture signal (having a field frequency of 60 Hz).

16 Claims, 11 Drawing Sheets

EXAMPLE OF PREDICTIVE TAPS

EXAMPLE OF CLASS TAPS

APPARATUS AND METHOD FOR CONVERTING A FIELD FREQUENCY OF A PICTURE SIGNAL

TECHNICAL FIELD

The present invention relates to a picture signal converting apparatus and a method thereof suitable for use with a television receiver, a VTR, and so forth.

RELATED ART

Conventionally, as television scanning field frequencies, 50 Hz (for PAL system and SECAM system) or 60 Hz (for NTSC system) have been widely used. A field frequency converting technology for converting the field frequency from 50 Hz to 60 Hz or vice versa is known. When the field frequency is converted from 50 Hz to 60 Hz, five fields as input fields should be converted into six fields as output fields. To obtain an output picture that has a smooth motion, a moving vector of an input picture is detected. Corresponding to the detected moving vector, output fields having sufficient time information are formed.

Thus, in the conventional field frequency converting technology, it is necessary to detect a moving vector. In other words, the hardware scale of the apparatus adversely becomes large. Since the accuracy for detecting the moving vector is not so high, the picture may deteriorate due to a moving vector that is incorrectly detected. In particular, an unnatural motion may take place in an output picture (this motion is referred to as jerkiness). In addition, an edge portion of a moving picture may become dull. Although the number of fields may be converted by a linear interpolating process rather than detecting a moving vector, a moving portion becomes dull.

Therefore, an object of the present invention is to provide a picture signal converting apparatus and a method thereof that allow a problem in a conventional field frequency converting technology to be solved.

DISCLOSURE OF THE INVENTION

To solve the above-described problem, the invention of claim 1 is a picture signal converting apparatus for converting a field frequency of an input picture signal in the relation of M and N (where M≠N; M and N are any natural numbers), comprising:

a class deciding portion for deciding a class for a considered pixel according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal, a memory portion for storing predictive information pre-obtained for each class, a predictive pixel selecting portion for selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal, and a pixel generating portion for generating each considered pixel of the output picture signal according to predictive information corresponding to the class decided by the class deciding portion and the plurality of pixels selected by the predictive pixel selecting portion.

The invention of claim 8 is a picture signal converting method for converting a field frequency of an input picture signal in the relation of M and N (where M≠N; M and N are any natural numbers), comprising the steps of:

deciding a class for a considered pixel according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal, selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal, and generating each considered pixel of the output picture signal according to predictive information corresponding to the class decided at the class deciding step and the plurality of pixels selected at the predictive pixel selecting step.

According to the present invention, the field frequency is converted by the class categorizing adaptive process. In the class categorizing adaptive process, using a teacher picture (equivalent to an output picture in the field frequency converting process) and a student picture (equivalent to an input picture in the field frequency converting process), a predictive coefficient that allows the sum of squares of errors of true values and predictive values to become minimum is defined. Thus, a picture having chronologically converted fields can be generated without need to detect a moving vector. Consequently, a large amount of hardware for detecting a moving vector is not required. In addition, since the field frequency converting process is performed by the class categorizing adaptive process, a large area is prevented from flickering because of a relatively low field frequency. Thus, a high quality picture can be provided.

BEST MODES FOR CARRYING OUT THE INVENTION

Next, an embodiment of the present invention will be described. According to the embodiment, the present invention is applied to a field frequency conversion of which the field frequency is converted from 50 Hz to 60 Hz. According to the present invention, pixels of an output picture signal having a field frequency of 60 Hz are generated by a class categorizing adaptive process.

In the class categorizing adaptive process, a picture signal as an input signal is categorized as classes corresponding to chronological and/or spatial features of the picture signal. Pre-learnt predictive coefficient coefficients for individual classes are stored in a storing means. An optimally estimated value is output by a calculation corresponding to a predicting expression. By the class categorizing adaptive process, the problem of jerkiness that takes place in the conventional field frequency conversion can be solved.

Figure 1:
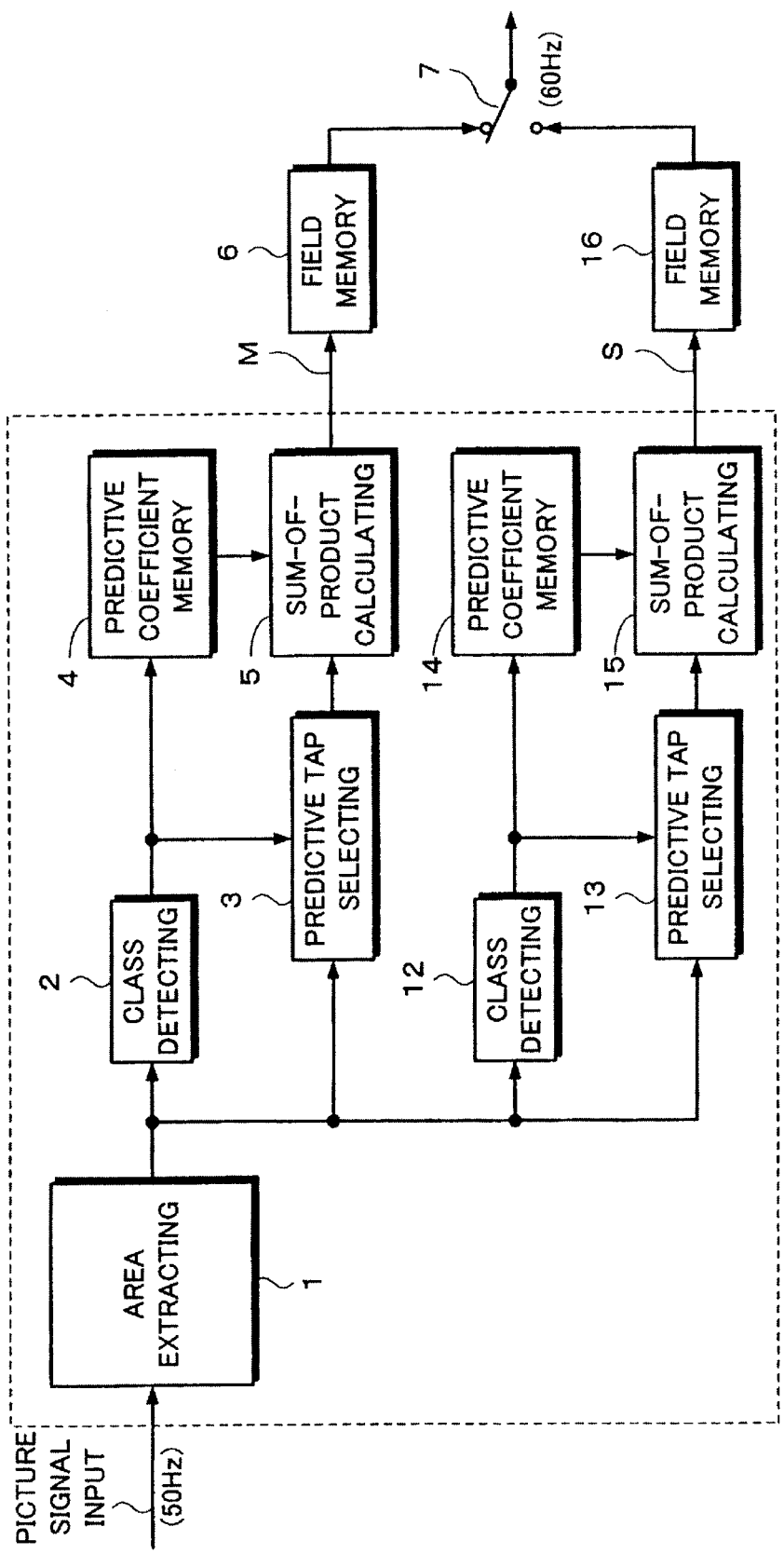
FIG. 1 is a block diagram of an embodiment of the present invention.

In an example of the pixel generating apparatus, as shown in FIG. 1, an input picture signal (an interlaced signal having a field frequency of 50 Hz) is supplied to an area extracting portion 1. The area extracting portion 1 extracts an area containing a plurality of pixels necessary for class categorizing and predicting calculations. An output of the area extracting portion 1 is supplied to class detecting circuits 2 and 12 and predictive tap selecting circuits 3 and 13. The class detecting circuits 2 and 12 detect classes corresponding to patterns of level distributions of input pixels in the vicinities of output pixels to be generated. The reason why two structures for generating pixels are used in parallel is in that two lines of an output picture are generated in the time period of one line of an input picture. One line information generated is denoted by M, whereas the other line information generated is denoted by S. An area surrounded by dotted lines represents a structure accomplished by an LSI.

Classes detected by the class detecting circuits 2 and 12 are supplied to the predictive tap selecting circuits 3 and 13 and predictive coefficient memories 4 and 14, respectively. Predictive coefficient sets corresponding to the classes are read from the predictive coefficient memories 4 and 14. The predictive coefficient sets are supplied to sum-of-product calculating circuits 5 and 15, respectively. The predictive tap selecting circuits 3 and 13 select predictive taps corresponding to the classes. When predictive coefficients of individual class are pre-learnt, both the predictive coefficients and predictive tap position information are obtained at a time. The predictive tap selecting circuits 3 and 13 have respective memories (not shown) that store predictive tap position information for individual classes. The predictive tap position information that is read corresponding to classes from the memories is supplied to a tap switching selector. The selector (not shown) selectively outputs predictive taps. Predictive taps are output from the predictive tap selecting circuits 3 and 13 to the sum-of-product calculating circuits 5 and 15.

The sum-of-product calculating circuits 5 and 15 calculate pixel values of an output picture signal with linear estimating expressions of predictive taps (pixels of an input picture signal) and predictive coefficient sets. The sum-of-product calculating circuits 5 and 15 output a first pixel value M and a second pixel value S of an output picture signal having a field frequency of 50 Hz that is the same field frequency as the input picture signal. The first pixel value is supplied from the sum-of-product calculating circuit 5 to a field memory 6. The second pixel value is supplied form the sum-of-product calculating circuit 15 to a field memory 16.

The field memories 6 and 16 perform a process for converting the field frequencies of the first pixel value and the second pixel value generated by the class categorizing adaptive process from 50 Hz to 60 Hz (speed converting process). Outputs of the field memories 6 and 16 are input to a selector 7. The selector 7 alternately selects the outputs of the field memories 6 and 16 for each field of 60 Hz. The selector 7 alternately selects the outputs of the field memories 6 an 16 and generates an output picture signal (having a field frequency of 60 Hz).

The output picture signal is supplied to a CRT display (not shown). The CRT display has a synchronous system that allows the output picture signal to be displayed. The input picture signal is for example a broadcast signal or a reproduction signal of a reproducing apparatus such as a VTR. In other words, this example can be disposed in a television receiver.

In addition to the field frequency, the horizontal line frequency (the number of lines) of the input picture signal may be different from those of the output picture signal. Thus, in this case, in addition to the conversion of the number of fields, the number of lines should be converted. The conversion of the number of lines can be also performed by the class categorizing adaptive process. Moreover, by the class categorizing adaptive process, the number of pixels in the horizontal direction of the input picture signal can be doubled. In a combination of these processes, a desired output picture signal can be formed. However, the main feature of the present invention is in that the number of fields is converted. Thus, the description for the conversion of the number of lines and the conversion of the number of pixels in the horizontal direction is omitted.

Figures 2A, 2B:
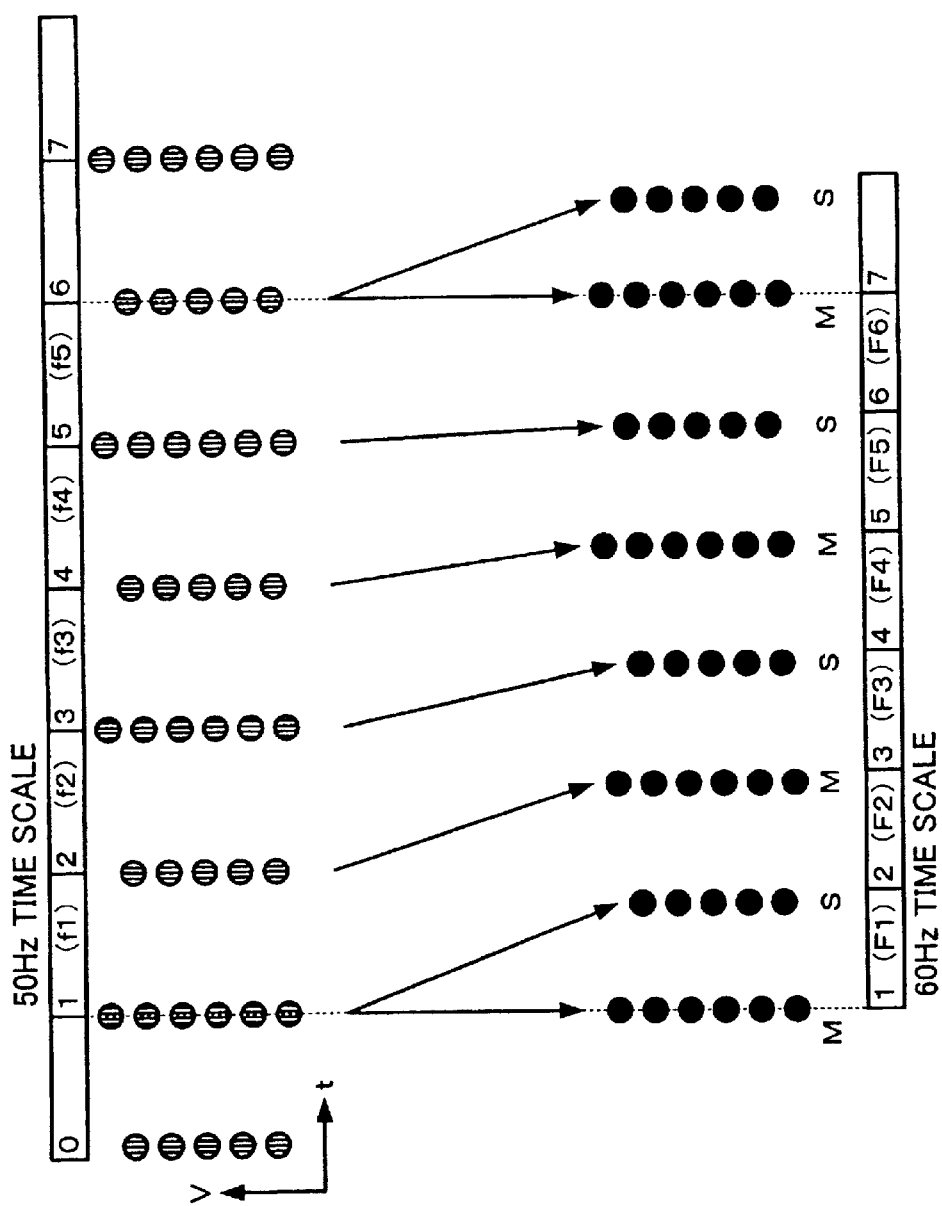
FIG. 2 is a schematic diagram for explaining a field frequency converting process according to the embodiment.

FIG. 2 shows the field converting operation according to the embodiment of the present invention. In FIG. 2, the horizontal axis represents the chronological direction, whereas the vertical axis represents the vertical direction. In FIG. 2, the number of pixels in the vertical direction (the number of lines) is reduced for simplicity. FIG. 2A shows an input picture signal represented in a time scale of 50 Hz. FIG. 2B shows an output picture signal represented in a time scale of 60 Hz.

Five fields of input fields f1 to f5 shown in FIG. 2A are converted into six fields of output fields F1 to F6 shown in FIG. 2B. The output field F1 is generated with the input field f1 as first output pixels M. The output field F2 is generated with the input field f1 as second output pixels S. The output field F3 is generated with the input field f2 as the first output pixels M. The output field F4 is generated with the input field f3 as second output pixels S. The output field F5 is generated with the input field f4 as first output pixels M. The output field F6 is generated with the input field f5 as second output pixels S. Thus, the input fields generated with the output fields by the class categorizing adaptive process are placed at chronologically close positions.

Figure 3A:
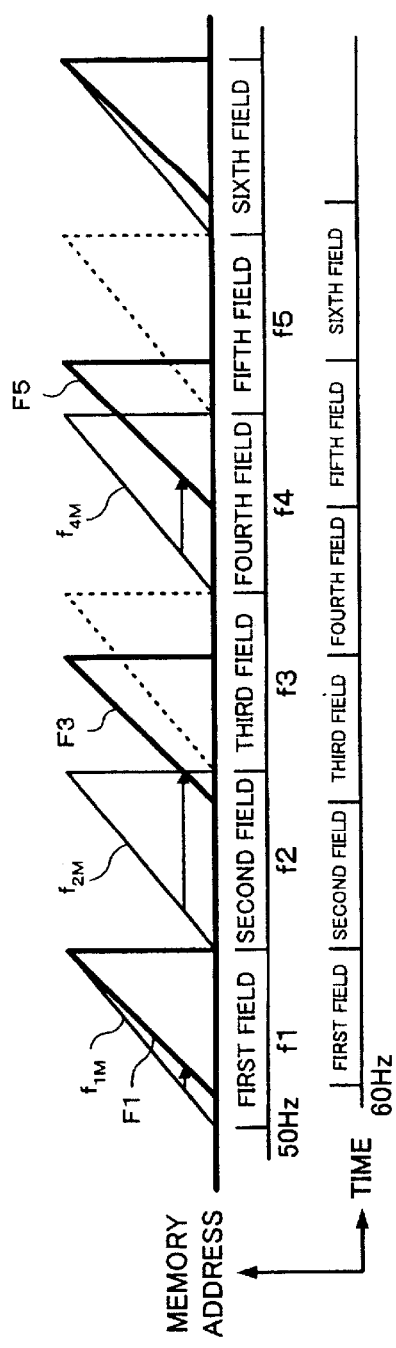
FIG. 3 is a timing chart for explaining the operation of a field memory of the field frequency converting process according to the embodiment.
Figure 3B:
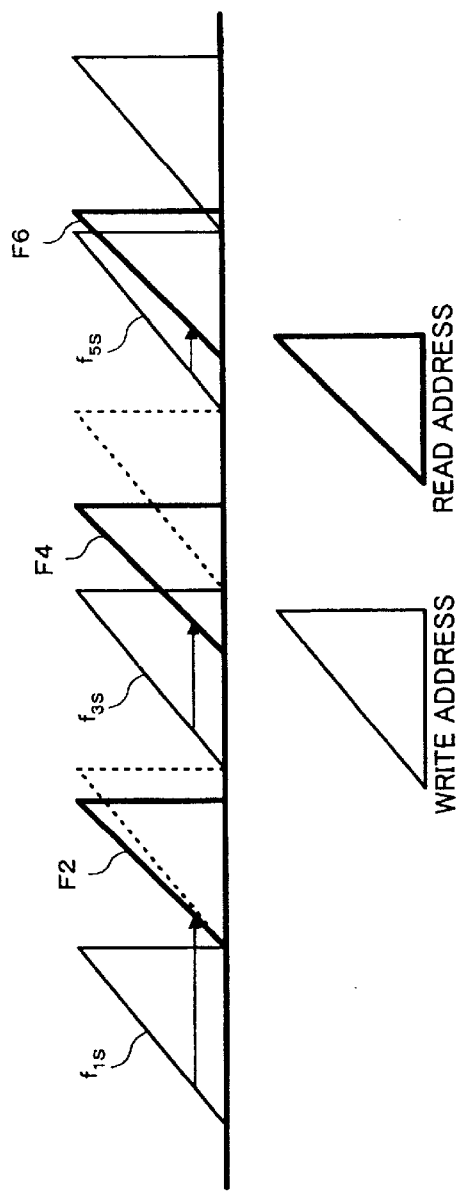

FIG. 3 shows the operations of the field memories 6 and 16. In FIG. 3, the horizontal axis represents the time, whereas the vertical axis represents addresses of the field memories 6 and 16. In FIG. 3, changes of write addresses of the field memories 6 and 16 are denoted by thin lines, whereas changes of read addresses of the field memories 6 and 16 are denoted by thick lines. FIG. 3A shows output generating operations of the sum-of-product calculating circuit 5 and the field memory 6. FIG. 3B shows output generating operations of the sum-of-product calculating circuit 15 and the field memory 16. Reference letters for individual fields shown in FIG. 3 correspond to those shown in FIG. 2.

As shown in FIG. 3A, a field f1$_M$ that is output from the sum-of-product calculating circuit 5 with the input field f1 is written to the field memory 6. As will be described later, when the phase of the input field f1 chronologically matches the phase of the output field F1, the field f1$_M$ that is output from the sum-of-product calculating circuit 5 is the same as the picture of the input field f1. In addition, as shown in FIG. 3B, a field f1$_S$ that is output from the sum-of-product calculating circuit 15 with the input field f1 is written to the field memory 16. The fields f1$_M$ and f1$_S$ are generated in the same frame period in the time scale of the input field frequency (50 Hz). An output field F1 (written field f1$_M$) is read from the field memory 6 in the time scale of the output field frequency (60 Hz). Likewise, an output field F2 (written field f1$_S$) is read from the field memory 16 in the time scale of the output field frequency. The output field F2 composes the next field of the output field F1.

A field f2$_M$ is generated with the input field f2 by the class categorizing adaptive process. The field f2$_M$ that is output from the sum-of-product calculating circuit 5 is written to the field memory 6. A field f2$_M$ is read in the time scale of 60 Hz and output as an output field F3. In the period of the input field f2, as denoted by a dotted line in FIG. 3B, since the field f1$_S$ is not used as an output field, it is not written to the field memory 16. A field f3$_S$ generated with the next input field f3 is written to the field memory 16. In the period of the input field f3, as denoted by a dotted line in FIG. 3A, since a field f3$_M$ is not used as an output field, it is not written to the field memory 6. An output field F4 is read from the field memory 16.

A field f4$_M$ generated with the next input field f4 is written to the field memory 6. In the period of the input field f4, as denoted by a dotted line in FIG. 3B, it is not written to the field memory 16. An output field F5 is read from the field memory 6. A field f5$_S$ generated with the next input field f5 is written to the field memory 16. In the period of the input field f5, as denoted by a dotted line in FIG. 3A, it is not written to the field memory 6. An output field F6 is read from the field memory 16.

The class categorizing adaptive process for generating the output fields F1 to F6 with the input fields f1 to f5 is repeated. As is clear from FIGS. 3A and 3B, in the field memory 6 and the field memory 16, a write address does not exceed a read address. Thus, data is normally read. The selector 7 alternately selects the output that is read from the field memory 6 (thick line portions shown in FIG. 3A) and the output that is read from the field memory 16 (thick line portions shown in FIG. 3B). Thus, the selector 7 generates an output picture signal of which the field frequency has been converted from 50 Hz to 60 Hz.

The structure of the class categorizing adaptive process shown in FIG. 1 corresponds to one component of a component color picture signal. Alternatively, the structure shown in FIG. 1 may be disposed for each of three components of a luminance signal and two color difference signals. In addition, the present invention can be applied to a composite color picture signal rather than a component color picture signal.

Figure 4:
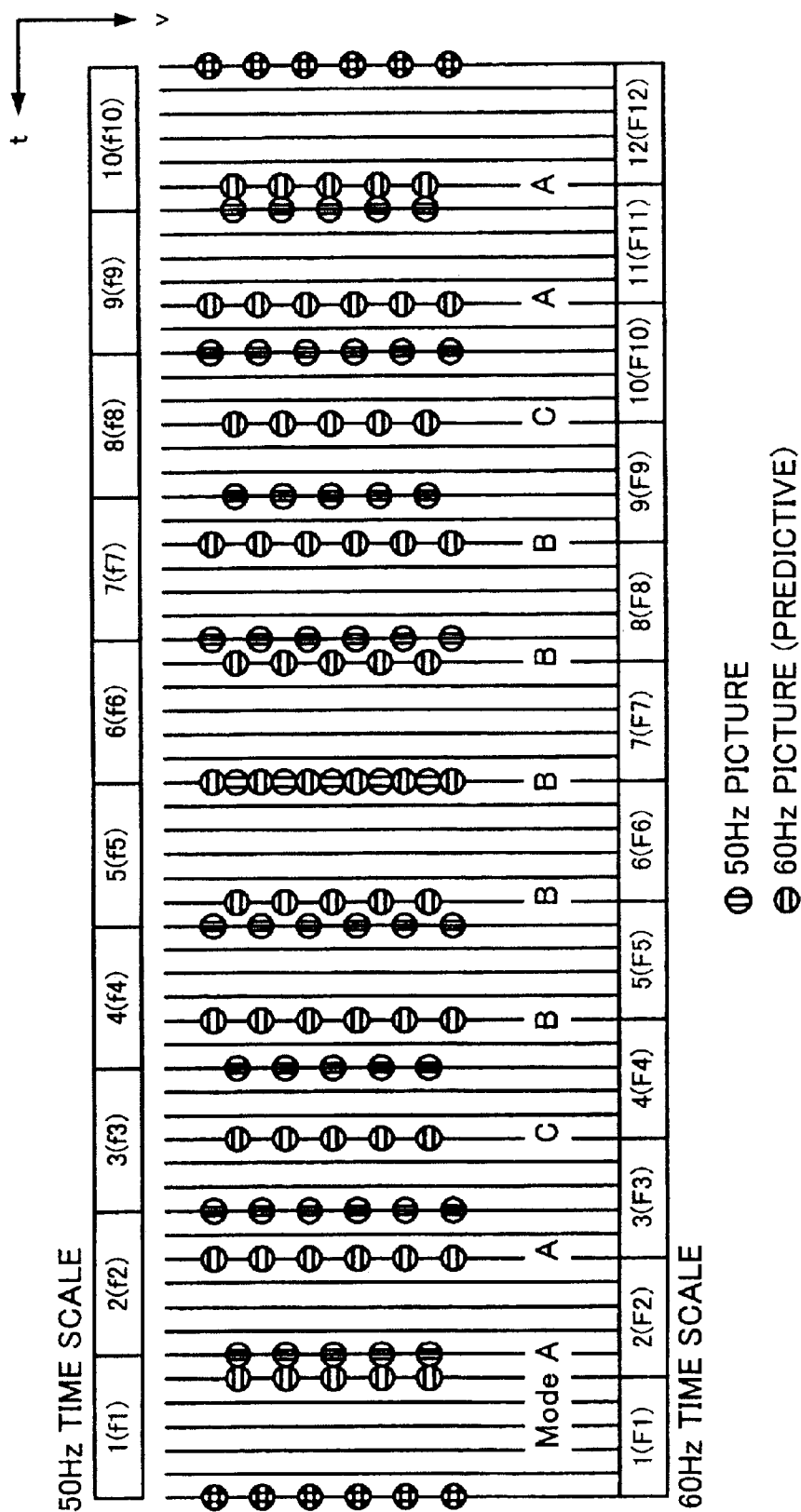
FIG. 4 is a schematic diagram for explaining the definition of modes of which the field frequency conversion is performed by a class categorizing adaptive process.

Next, the class categorizing adaptive process according to the embodiment of the present invention will be described in detail. First of all, an example of class taps and predictive taps designated in the class categorizing adaptive process will be described. With reference to FIG. 4, modes of the class categorizing adaptive process will be defined. In FIG. 4, one pattern is formed of 10 fields as an interlaced picture signal. On the other hand, in FIG. 2, one pattern is formed of five fields. When a picture signal is not an interlaced picture signal of which pixel positions are considered (namely, only a chronological relation is considered), as shown in FIG. 2, one pattern is formed of five fields.

FIG. 4 shows an input picture having a field frequency of 50 Hz and an output picture having a field frequency of 60 Hz. In the output field F1 that chronologically matches the phase of the input field f1, the same picture as the input field f1 is output. However, the picture of the output field F1 may be generated by the class categorizing adaptive process. The following modes are defined corresponding to the chronological relation between the input fields and the output fields and to the vertical pixel positions thereof.

As with the output fields F1, F2, and F3, the case that the vertical positions of pixels of chronologically most adjacent input fields are the same is defined as mode A (this mode includes the case that the vertical positions of pixels of input fields that chronologically match are the same). As with the output fields F5 and F6, the case that the vertical positions of pixels of chronologically most adjacent input fields deviate by ½ lines is defined as mode B. As with the output field F4, the case that an output field is placed at the chronologically center position of the input fields f3 and f4 is defined as mode C. These modes are defined so as to learn predictive coefficient sets for individual modes. Thus, the predicting accuracy is improved. Corresponding to the distance between the most adjacent two input fields, each mode can be sub-divided. However, in this case, since the hardware scale of the apparatus becomes large. Thus, according to the embodiment, each mode is not sub-divided.

Figure 5:
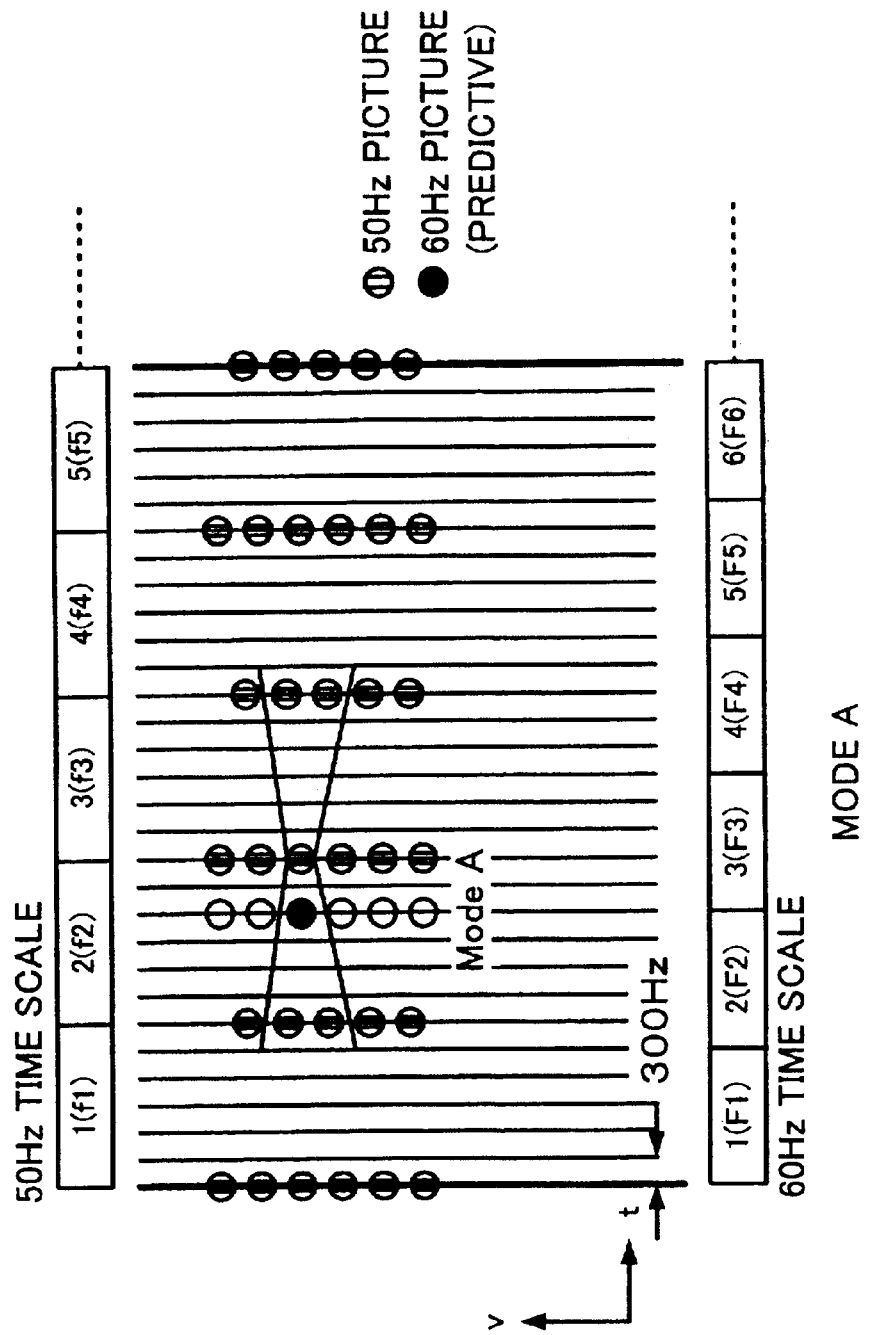
FIG. 5 is a schematic diagram for explaining a tap structure in mode A.

FIG. 5 shows a tap structure in the mode A. In FIG. 5, the vertical axis represents the vertical direction, whereas the horizontal axis represents the horizontal direction. FIG. 5 shows pixel positions in the case that a particular pixel (denoted by a black circle) of an output field (for example, F3) is generated. In the mode A, using pixels contained in the input fields f2, f3, and f4, a pixel of the output field F3 is generated by the class categorizing adaptive process. In other words, two pixels that are contained in the input field f2, that are placed at the vertically upper and lower positions of the pixel to be predicted, and that deviate by ½ lines from the pixel to be predicted, one pixel that is contained in the input field f3 and that is placed at the same position as the pixel to be predicted, and two pixels that are contained in the input field f4, that are placed at the vertically upper and lower positions of the pixel to be predicted, and that deviate by ½ lines from the pixel to be predicted are used. For example, a pixel in the field F3 is generated by the class detecting circuit 2, the predictive tap selecting circuit 3, the predictive coefficient memory 4, and the sum-of-product calculating circuit 5.

Figure 6:
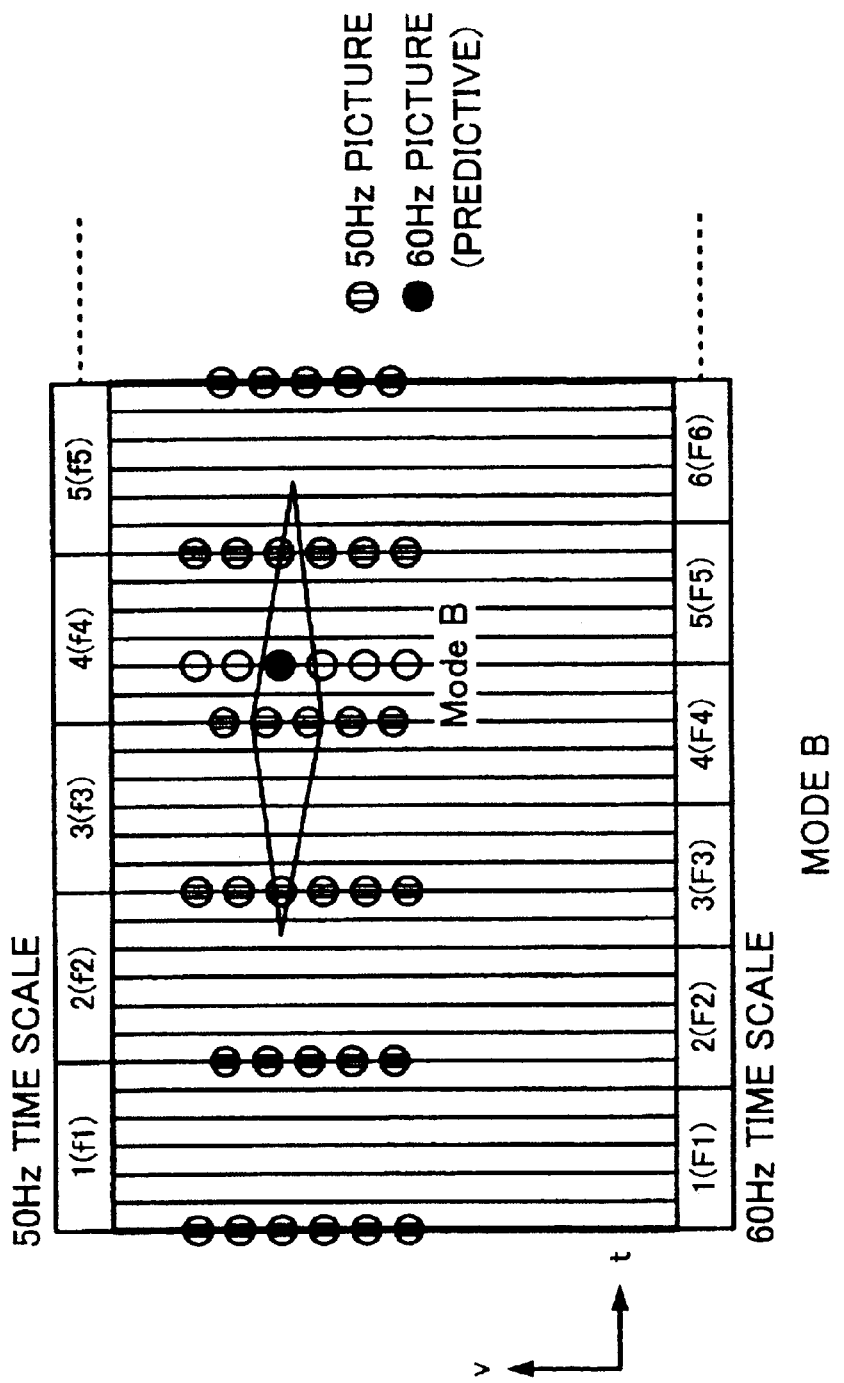
FIG. 6 is a schematic diagram for explaining a tap structure in mode B.

FIG. 6 shows a tap structure in the mode B. In FIG. 6, the vertical axis represents the vertical direction, whereas the horizontal axis represents the chronological direction. FIG. 6 shows pixel positions in the case that a particular pixel (denoted by a black circle) of an output field (for example, F5) is generated. In the mode B, using pixels contained in the input fields f3, f4, and f5, a pixel of the output field F5 is generated by the class categorizing adaptive process. In other words, a pixel that is contained in the input field f3 and that is placed at the same position as the pixel to be predicted, two pixels that are contained in the input field f4, that are placed at the vertically upper and lower positions of the pixel to be predicted, and that deviate by ½ lines from the pixel to be predicted, and a pixel that is contained in the input field f5 and that is placed at the same position as the pixel to be predicted are used. For example, a pixel of the field F5 is generated by the class detecting circuit 5, the predictive tap selecting circuit 3, the predictive coefficient memory 4, and the sum-of-product calculating circuit 5.

Figure 7:
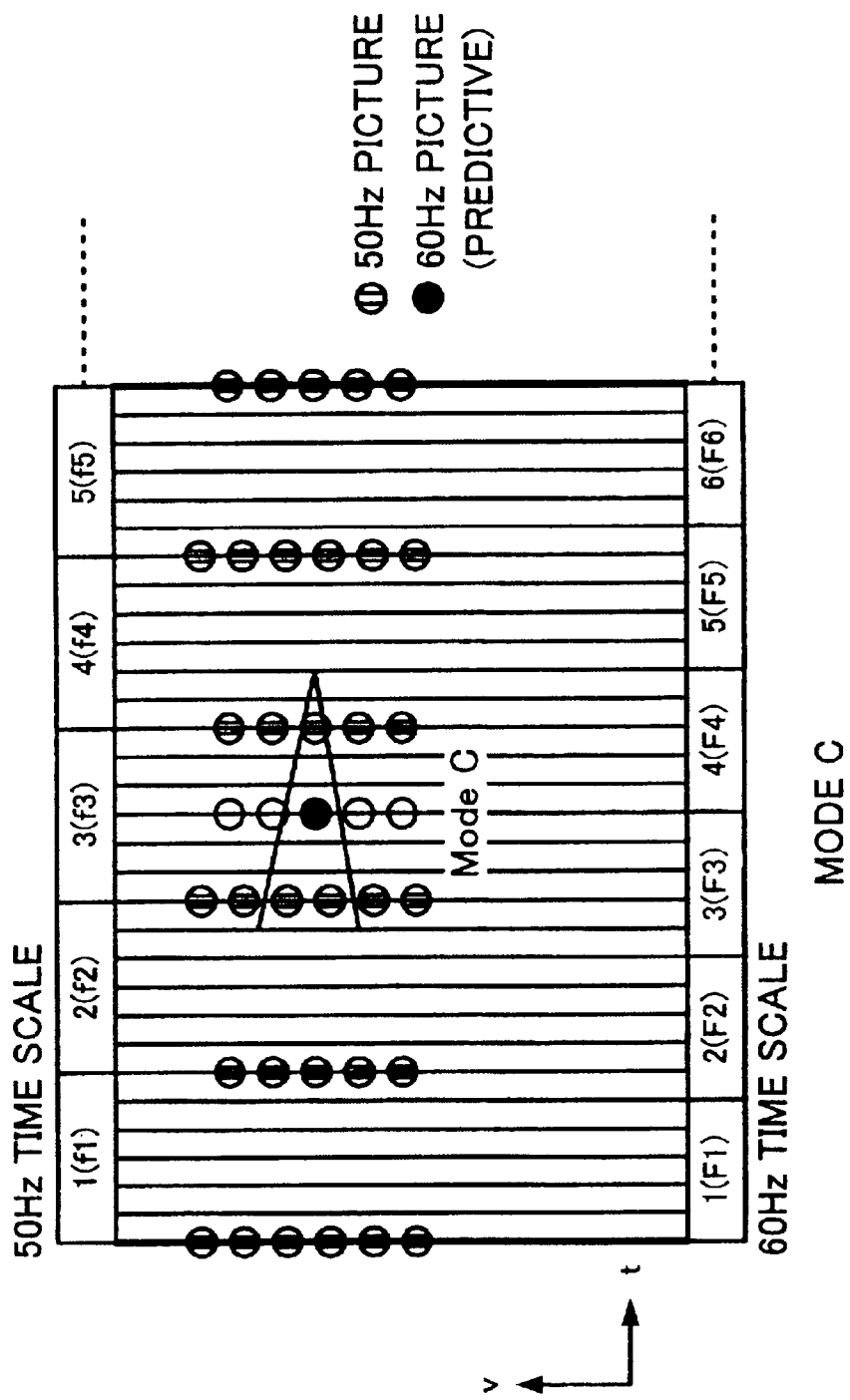
FIG. 7 is a schematic diagram for explaining a tap structure in mode C.

FIG. 7 shows a tap structure in the mode C. In FIG. 7, the vertical axis represents the vertical direction, whereas the horizontal axis represents the chronological direction. FIG. 7 shows pixel positions in the case that a particular pixel (denoted by a black circle) of an output field (for example, F4) is generated. In the mode C, using pixels contained in the input fields f3 and f4, a pixel of the output field F4 is generated by the class categorizing adaptive process. In other words, a pixel that is contained in the input field f3, that are placed at the vertically upper and lower positions of the pixel to be predicted, and that deviate by ½ lines from the pixel to be predicted and a pixel that is contained in the input field 4 and that is placed at the same position as the pixel to be predicted are used. For example, a pixel of the field F4 is generated by the class detecting circuit 12, the predictive tap selecting circuit 13, the predictive coefficient memory 14, and the sum-of-product calculating circuit 15.

The tap structures shown in FIGS. 5, 6, and 7 represent input pixels used as class taps and predictive taps and fields that contain them. The class taps and predictive taps may extend in the horizontal direction of each field as well as in the chronological direction and the vertical direction. The structure of class taps may be different from the structure of predictive taps. The class taps and predictive taps are switched corresponding to each mode by the class detecting circuits 2 and 12 and the predictive tap selecting circuits 3 and 13, respectively. The area extracting circuit 1 outputs all input pixels that are expected to be used as class taps and predictive taps at a time.

Figure 8A:
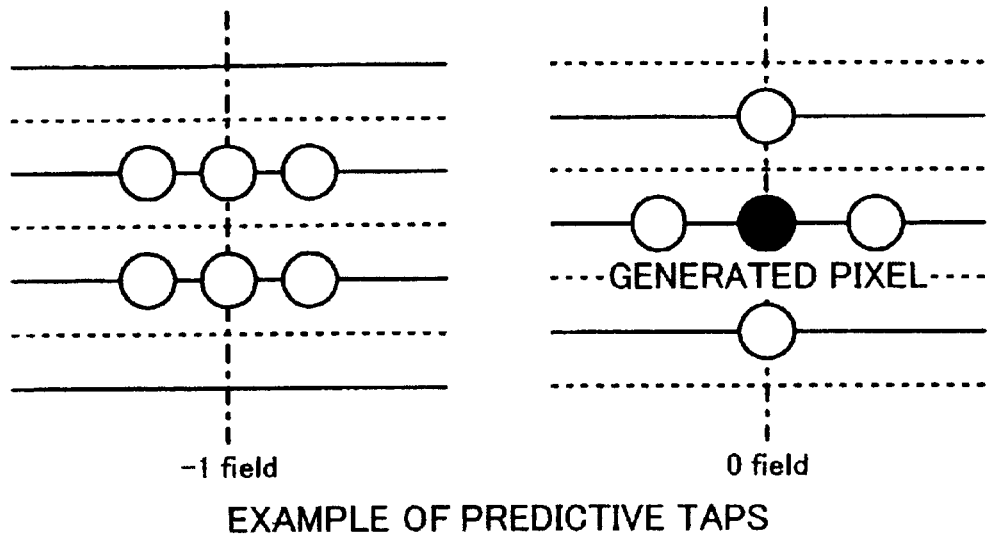
FIG. 8 is a schematic diagram showing an example of a spatial arrangement of predictive taps and class taps.
Figure 8B:
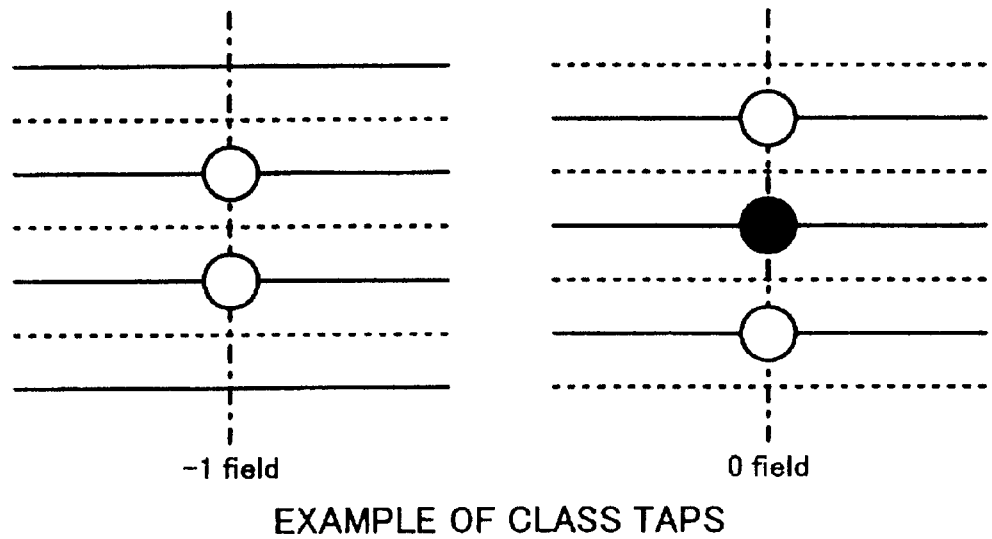

Next, an example of a spatial arrangement of class taps and predictive taps will be described. For example, as shown in FIG. 8, with a plurality of input pixels, predictive taps may be spatially generated. As shown in FIG. 8B, with a plurality of input pixels, class taps may be generated. In FIGS. 8A and 8B, the vertical axis represents a vertical arrangement of pixels, whereas the horizontal axis represents a horizontal arrangement of pixels. As shown in FIG. 8A, predictive taps are generated with six input pixels that are contained in the—first field and that are placed at the vertically upper and lower positions of the pixel to be generated (denoted by a black circle) and four input pixels that are contained in the 0-th field and that are placed at adjacent positions (upper, lower, left, and right positions) of the pixel to be generated. In other words, the predictive taps are generated with a total of 10 input pixels.

As shown in FIG. 8B, class taps are generated with two pixels that are contained in the—first field and that are placed at the vertically upper and lower positions of the pixel to be generated and two pixels that are contained in the 0-th field and that are placed at the vertically upper and lower positions of the pixel to be generated.

The class detecting circuits 2 and 12 detect patterns of level distributions of class taps. In this case, to prevent the number of classes from becoming large, a process for compressing input data of eight bits is performed so as to decrease the number of bits. For example, data of input pixels as class taps is compressed corresponding to ADRC (Adaptive Dynamic Range Coding) method. Besides the ADRC method, another compressing method such as DPCM (predictive encoding) method, VQ (Vector Quantizing) method, or the like may be used.

Although the ADRC method is an adaptive re-quantizing method that was developed for a highly efficiently encoding process for a VTR (Video Tape Recorder), since a local pattern of a signal level can be effectively represented with a short word length, in the example, the ADRC method is used to generate a class categorizing code. In the ADRC method, assuming that the dynamic range of class taps is denoted by Dr, the number of bits assigned thereto is denoted by n, the data level of pixels of class taps is denoted by L, and a re-quantized code is denoted by Q, the region between the maximum value MAX and the minimum value MIN is equally divided by a designated bit length so as to perform a re-quantizing process using Expression (1).

$$DR = MAX - MIN + 1$$

$$Q = \{(L - MIN + 0.5) \times 2^n / DR\} \quad (1)$$

where { } represents a truncating operation.

A class may be detected along with a moving class. In this case, corresponding to a moving class, class taps may be switched. Since a moving class is generated corresponding to the difference between two frames, the hardware scale is smaller than the case that a moving vector is detected.

The sum-of-product calculating circuits 5 and 15 generate pixel values by a liner combination of predictive taps (pixel values) selected by the predictive tap selecting circuits 3 and 13 and coefficients that are read from the predictive coefficient memories 4 and 14. Besides the linear expression, pixel values may be generated by a high order estimating expression. In this case, as shown in the timing chart of FIG. 3, the predictive coefficient memory 4 stores a predictive coefficient table for generating the output fields F3 and F5, whereas the predictive coefficient memory 14 stores a predictive coefficient table for generating the output fields F2, F4, and F6. Each table contains a plurality of predictive coefficient sets corresponding to the mode and the classes detected by the class detecting circuits 2 and 12. Each table (predictive coefficients) is pre-obtained by a learning process (that will be described later).

The sum-of-product calculating circuit 5 calculates a linear combination expression (Expression (2)) of predictive taps (pixel values) $x1, x2, \ldots, xi$ received from the predictive tap selecting circuit 3 or 13 and a predictive coefficient set $w_1, w_2, \ldots, w_i$ and obtains a pixel value. Likewise, the sum-of-product calculating circuit 15 obtains a pixel value.

$$L1 = w_1 x1 + w_2 x2 + \ldots + w_i xi \quad (2)$$

Predictive coefficient sets for individual classes are pre-learnt and pre-stored to the predictive coefficient memories 4 and 14. A calculation is performed corresponding to the input predictive taps and the predictive coefficient set that is read. Since output data is formed corresponding to input data, the number of fields can be converted without detecting a moving vector.

Figure 9:
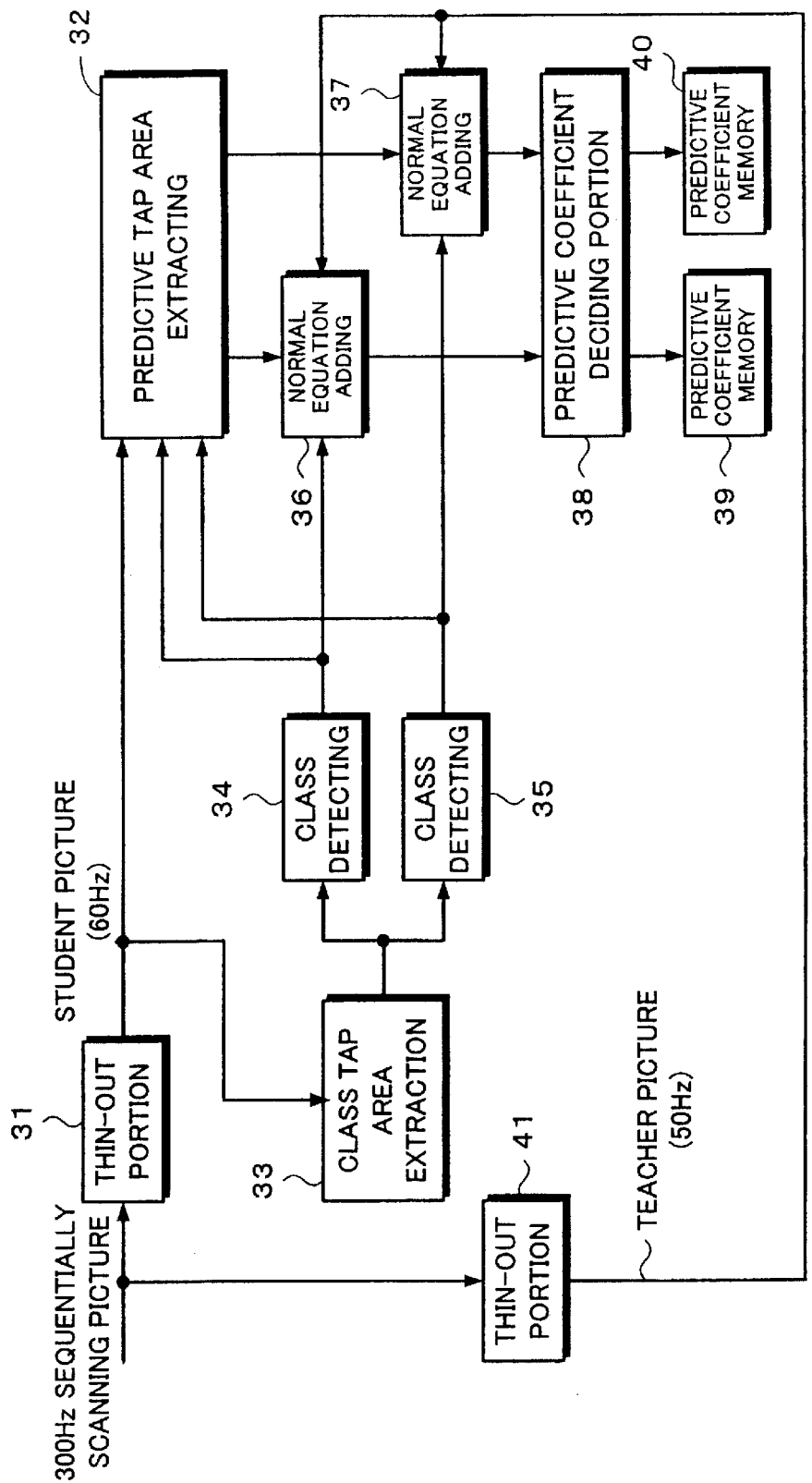
FIG. 9 is a block diagram showing a structure for learning predictive coefficients.

Next, with reference to FIG. 9, a process for generating (learning) predictive coefficients will be described. To learn predictive coefficients, a progressive picture having a field frequency of 300 Hz is photographed by a high speed video camera. A thin-out portion 31 halves the number of pixels in the vertical direction of the progressive picture signal and forms an interlaced picture signal having a field frequency of 60 Hz (student picture). In addition, a thin-out portion 41 halves the number of pixels in the vertical direction and forms a picture signal having a field frequency of 50 Hz (teacher signal). The teacher picture received from the thin-out portion 41 and the student picture received from the thin-out portion 31 are paired in the learning process. The input picture shown in FIG. 1 corresponds to the student signal, whereas the output picture corresponds to the teacher signal. In the learning process, predictive coefficients that allow the sum of squares of errors of pixels of the teacher picture (true values) and the student picture to be minimum are obtained by the method of least squares.

Figure 10:
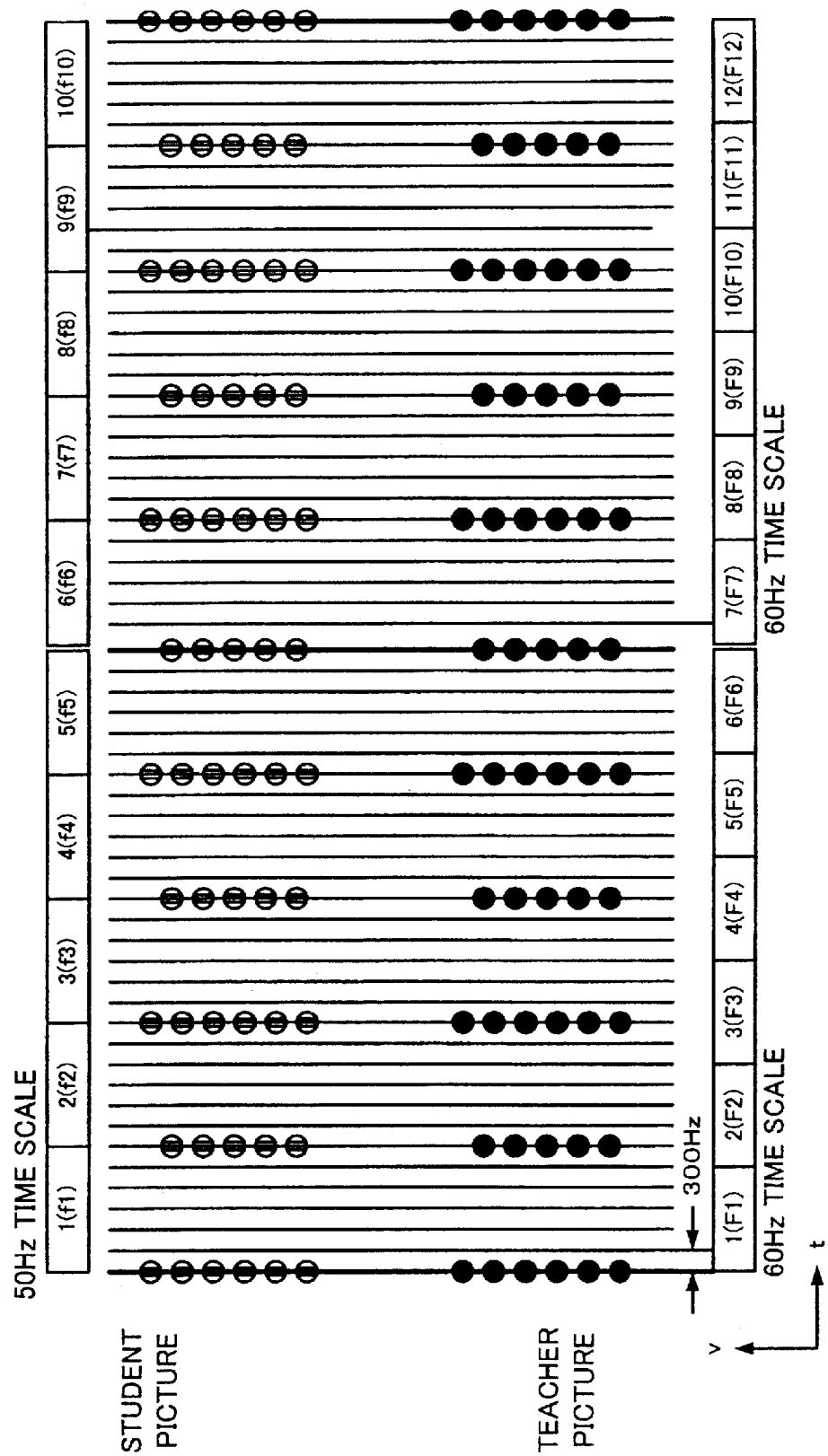
FIG. 10 is a schematic diagram showing the relation between a student picture and a teacher signal used in learning predictive coefficients.

FIG. 10 shows a pixel structure in the case that predictive coefficients are learnt. In FIG. 10, the vertical axis represents the vertical direction, whereas the horizontal axis represents the horizontal direction. The thin-out portion 31 thins out the progressive picture having a field frequency of 300 Hz in the chronological direction by ⅙ and the number of lines by ½ and generates an interlaced student signal having a field frequency of 50 Hz. On the other hand, the thin-out portion 41 thins out the progressive picture having a field frequency of 300 Hz in the chronological direction by ⅕ and the number of lines by ½ and generates an interlaced teacher signal having a field frequency of 60 Hz.

The student picture signal is supplied from the thin-out portion 31 to both a predictive tap area extracting portion 32 and a class tap area extracting portion 33. Class taps are supplied from the class tap area extracting portion 33 to both class detecting circuits 34 and 35. The predictive tap area extracting portion 32 outputs predictive taps for generating a pixel in each mode. The class detecting circuits 34 and 35 compress data of class taps for each mode corresponding to the ADRC method and generate class information. These class taps and predictive taps are structured as described above (see FIGS. 4 to 7).

Predictive taps are supplied from the predictive tap area extracting portion 32 to normal equation adding circuits 36 and 37. Next, the normal equation adding circuits 36 and 37 will be described as a learning process for learning a converting expression for converting a plurality of input pixels into an output pixel and a signal converting process using such a predicting expression. In the following description, an output pixel is predicted with n pixels as a general expression. Assuming that levels of input pixels selected as predictive taps are denoted by $x_1, \ldots, x_n$ and a level of an output pixel of a teacher picture is denoted by y, an n-tap linear estimating expression with a predictive coefficient set $w_1, \ldots, w_n$ for each class is defined as Expression (3). Before predictive coefficients are learnt, wi is an indeterminate coefficient.

$$y = w_1 x_1 + w_2 x_2 + \ldots + w_n x_n \quad (3)$$

The learning process is performed for a plurality of picture signals for each class. When the number of pieces is m, Expression (4) is obtained corresponding to Expression (3).

$$y_k = w_1 x_{k1} + w_2 x_{k2} + \ldots + w_n x_{kn} \quad (4)$$

(where k=1, 2, . . . , m)

In the case of m>n, since a predictive coefficient set $w_1, \ldots, w_n$ is not uniquely decided, elements of an error vector e are defined by Expression (5). A predictive coefficient set that minimizes Expression (6) is obtained using so-called method of least squares.

$$e_k = y_k - \{w_1 x_{k1} + w_2 x_{k2} + \ldots + w_n x_{kn}\} \quad (5)$$

(where k=1, 2, . . . , m)

$$e^2 = \sum_{k=0}^{m} e_k^2 \quad (6)$$

Now, partial differential coefficients with respect to $w_i$ of Expression (6) are obtained. To do that, each coefficient $w_i$ is obtained in such a manner that Expression (7) becomes '0'.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \quad (7)$$

When $X_{ij}$ and $Y_i$ are defined as Expression (8) and Expression (9), respectively, Expression (7) can be given as Expression (10) using a matrix.

$$X_{ji} = \sum_{p=0}^{m} x_{pi} \cdot x_{pj} \quad (8)$$

$$Y_i = \sum_{k=0}^{m} x_{ki} \cdot y_k \quad (9)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \quad (10)$$

This equation is generally referred to as normal equation. The normal equation adding circuits 36 and 37 shown in FIG. 9 perform adding operations of the normal equation using the class information supplied from the class detecting circuits 34 and 35, predictive taps supplied from the predictive tap area extracting portion 32, and pixels of the teacher picture.

After data of a sufficient number of frames necessary for learning predictive coefficients has been input, the normal equation adding circuits 36 and 37 output normal equation data to a predictive coefficient deciding portion 38. The predictive coefficient deciding portion 38 solves the normal equation with respect to $w_i$ using a conventional matrix solution such as sweep-out method and calculates a predictive coefficient set. The predictive coefficient deciding portion 38 writes the calculated predictive coefficient set to predictive coefficient memories 39 and 40.

As a result of the learning process, predictive coefficients that allow a considered pixel y of an output picture signal to be estimated for each class are stored to the predictive coefficient memories 39 and 40. The predictive coefficient sets stored in the predictive coefficient memories 39 and 40 are loaded to the predictive coefficient memories 4 and 14 of the above-described picture converting apparatus.

The number of predictive taps that are output from the predictive tap area extracting portion 32 is larger than the number of predictive taps used in the pixel generating apparatus. Thus, the predictive coefficient deciding portion 38 obtains many predictive coefficient sets for each class. Predictive coefficient sets having the largest absolute values are selected from the obtained predictive coefficient sets. The selected predictive coefficient sets are stored to addresses corresponding to individual classes of the predictive coefficient memories 39 and 40. Thus, predictive taps are selected for individual classes. Selection position information of predictive taps for individual classes is stored to memories (not shown). By such a predictive tap selecting process, predictive taps corresponding to individual classes can be selected.

In the above-described process, using a linear estimating expression, a learning process for learning predictive coefficients for generating data of a picture having a field frequency of 60 Hz with data having a field frequency of 50 Hz is completed.

In the above-described example, the converting process for converting the field frequency from 50 Hz to 60 Hz was described. In contrast, the present invention can be applied to the converting process for converting the field frequency from 60 Hz to 50 Hz. In addition, according to the present invention, the field frequencies of the input picture signal and the output picture signal are not limited to 50 Hz and 60 Hz. Likewise, the present invention can be applied to the case that the field frequency is converted from M to N (where M≠N; M and N are any integers that are not 1). For example, an input picture signal having a field frequency of 48 Hz can be converted into a picture signal having a field frequency of 60 Hz. In addition, the present invention can be applied to a process for converting a field frequency of a computer picture such as VGA (Video Graphics Array, 640×480 pixels), XGA (extended Graphics Array, 1024×768 pixels), and so forth. Moreover, while the process for converting the field frequency is being performed, a process for doubling the number of pixels in the horizontal direction and/or the vertical direction can be performed.

FIG. 11 is a schematic diagram for explaining a process for converting the field frequency from 60 Hz to 50 Hz. As with the structure shown in FIG. 3, FIG. 11 shows the operations of two field memories. In FIG. 11, the horizontal axis represents time, whereas the vertical axis represents addresses of the field memories. Changes of write addresses of the field memories are denoted by thin lines, whereas changes of read addresses are denoted by thick lines.

Figures 11A, 11B:
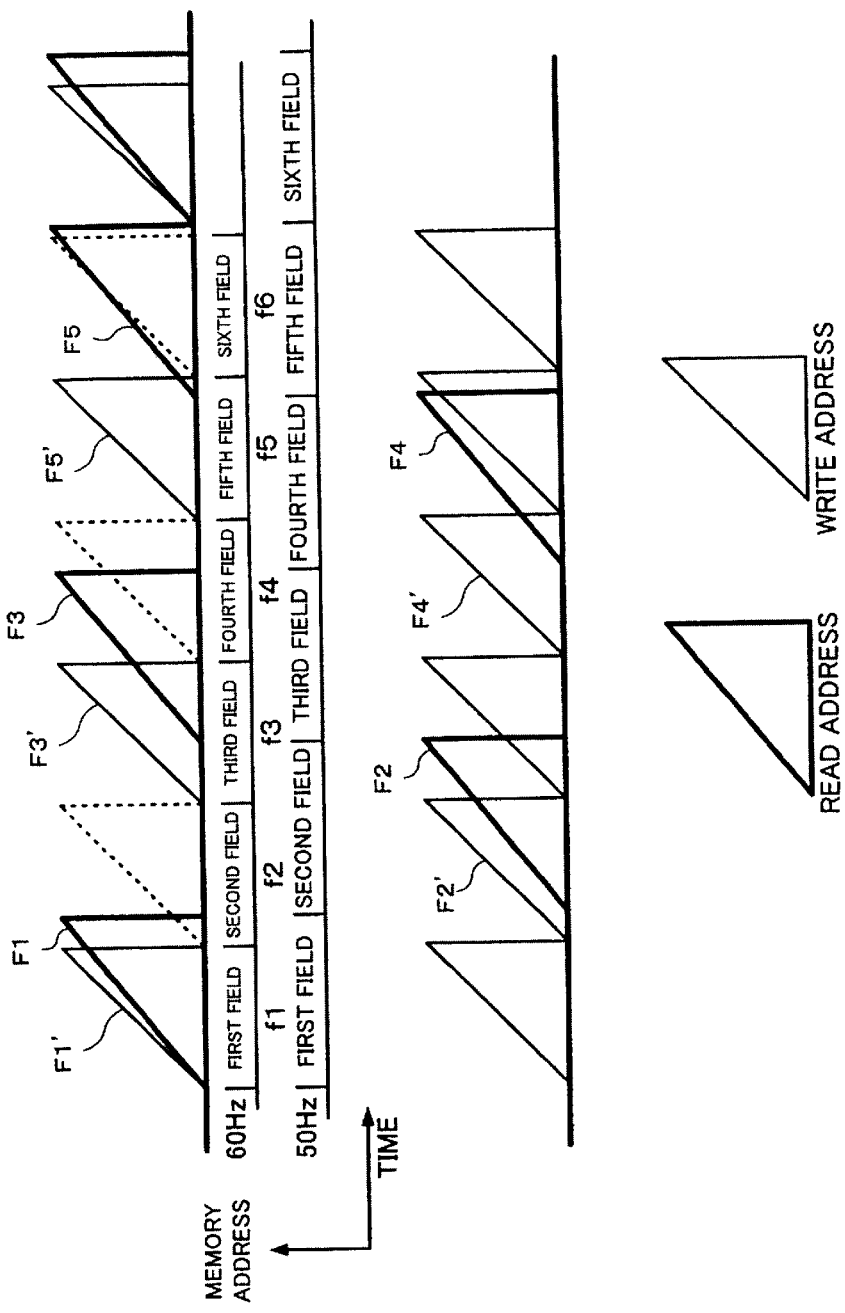
FIG. 11 is a timing chart for explaining the operation of a field memory in the field frequency converting process according to another embodiment of the present invention.

As shown in FIG. 11A, a field F1' having the same picture as an input field f1 is written to one field memory (referred to as first field memory). In the time scale of 50 Hz, the field F1' is read as an output field F1. In addition, as shown in FIG. 11B, a field F2' generated with an input field f2 by the class categorizing adaptive process is written to the other field memory (referred to as second field memory). The field F2' is read as a field F2. In the period of the field f2, the field F2' is not written to the first field memory.

A field F3' is generated with an input field f3 by the class categorizing adaptive process. The field F3' is written to the first field memory. The field F3' is read in the time scale of 50 Hz and output as an output field F3. A field F4' generated with the next input field f4 is written to the second field memory. An output field F5' generated with an input field f5 is written to the first field memory and output as an output field F5. In the period of the input field f5, as denoted by a dotted line shown in FIG. 11A, the output field F5' is not written to the first field memory. The second field memory does not have a pause period of the write operation. In other words, in the second field memory, even if an input field that is not required for a class categorization is written, the input field is substituted with an input field that is required for a class categorization.

The class categorizing adaptive process for generating the output fields F1 to F5 with the input fields f1 to f6 is repeated. As are clear from FIGS. 11A and 11B, in each field memory, a write address does not exceed a read address. Thus, data is normally read. As with the above-described embodiment, read outputs (thick line portions shown in FIG. 11) of the field memories can be alternately selected for each output field. Thus, an output picture signal of which the field frequency has been converted from 60 Hz to 50 Hz is generated.

When the picture information converting apparatus according to the present invention is disposed between a displaying device such as a CRT display and an input signal source, the problem of which the field frequency of the displaying device does not match the field frequency of the input picture signal can be solved.

According to the present invention, since the field frequency (the number of fields) is converted by the class categorizing adaptive process, it is not necessary to detect a moving vector. Thus, since a means for detecting a moving vector is not required, the hardware scale of the apparatus does not become large. As a result, the deterioration of picture quality due to improper accuracy of a detected moving vector does not take place. Moreover, in comparison with the method for converting the number of fields using a linear transforming method, a moving picture can be prevented from becoming dull. In addition, when the field frequency of a picture signal is converted from a low frequency into a high frequency (for example, from 50 Hz to 60 Hz), flickering of a large area can be prevented.

What is claimed is:

1. A picture signal converting apparatus for converting a field frequency of an input picture signal in the relation of M and N (where M≠N; M and N are any natural numbers), comprising:

a class deciding portion for deciding a class for a considered pixel from among a plurality of classes according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal;

a memory portion for storing predictive information pre-obtained for each class;

a predictive pixel selecting portion for selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal; and a pixel generating portion for generating each considered pixel of the output picture signal according to predictive information corresponding to the class decided by said class deciding portion and the plurality of pixels selected by said predictive pixel selecting portion, in which said plurality of classes include a first class wherein vertical positions of a number of pixels of a respective input field which is most chronologically adjacent to a respective output field are the same, a second class wherein the vertical positions of a number of pixels of a respective input field which is most chronologically adjacent to a respective output field deviate therebetween by ½ lines, and a third class wherein the respective output field is located at a chronologically center position between two respective adjacent input fields.

2. The picture signal converting apparatus as set forth in claim 1, wherein said class deciding portion, said predictive pixel selecting portion, and said pixel generating portion cause each considered pixel of the output picture signal to be generated for at least all fields of the output picture signal whose phases do not match the phases of the fields of the input picture signal.

3. The picture signal converting apparatus as set forth in claim 1, wherein said class deciding portion decides a class of the considered pixel according to a plurality of pixels selected from a predetermined number of fields that are early and late fields of a field of the input picture signal, the field of the input picture signal being placed as a center field most chronologically adjacent to the considered field of the output picture signal.

4. The picture signal converting apparatus as set forth in claim 1, wherein said predictive pixel selecting portion selects a plurality of pixels from a predetermined number of fields that are early and late fields of a field of the input picture signal, the field of the input picture signal being placed as a center field most chronologically adjacent to the considered field of the output picture signal.

5. The picture signal converting apparatus as set forth in claim 1, wherein said pixel generating portion calculates a linear estimating expression of the predictive information corresponding to the class decided by said class deciding portion and the plurality of pixels selected by said predictive pixel selecting portion so as to generate each considered pixel of the output picture signal.

6. The picture signal converting apparatus as set forth in claim 1, wherein the input picture signal and the output picture signal are interlaced signals.

7. The picture signal converting apparatus as set forth in claim 1, wherein the relation of M=5 and N=6 is satisfied.

8. A picture signal converting method for converting a field frequency of an input picture signal in the relation of M and N (where M≠N; M and N are any natural numbers), comprising the steps of:

deciding a class for a considered pixel from among a plurality of classes according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal, selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal; and generating each considered pixel of the output picture signal according to predictive information corresponding to the class decided at the class deciding step and the plurality of pixels selected at the predictive pixel selecting step, in which said plurality of classes include a first class wherein vertical positions of a number of pixels of a respective input field which is most chronologically adjacent to a respective output field are the same, a second class wherein the vertical positions of a number of pixels of a respective input field which is most chronologically adjacent to a respective output field deviate therebetween by ½ lines, and a third class wherein the respective output field is located at a chronologically center position between two respective adjacent input fields.

9. The picture signal converting method as set forth in claim 8, wherein the class deciding step, the predictive pixel selecting step, and the pixel generating step are performed for at least all fields of the output picture signal whose phases do not match the phases of the fields of the input picture signal.

10. The picture signal converting method as set forth in claim 8, wherein the class deciding step is performed by deciding a class of the considered pixel according to a plurality of pixels selected from a predetermined number of fields that are early and late fields of a field of the input picture signal, the field of the input picture signal being placed as a center field most chronologically adjacent to the considered field of the output picture signal.

11. The picture signal converting method as set forth in claim 8, wherein the predictive pixel selecting step is performed by selecting a plurality of pixels from a predetermined number of fields that are early and late fields of a field of the input picture signal, the field of the input picture signal being placed as a center field most chronologically adjacent to the considered field of the output picture signal.

12. The picture signal converting method as set forth in claim 8, wherein the pixel generating step is performed by calculating a linear estimating expression of the predictive information corresponding to the class decided at the class deciding step and the plurality of pixels selected at the predictive pixel selecting step so as to generate each considered pixel of the output picture signal.

13. The picture signal converting method as set forth in claim 8, wherein the input picture signal and the output picture signal are interlaced signals.

14. The picture signal converting method as set forth in claim 8, wherein the relation of M=5 and N=6 is satisfied.

15. A picture signal converting apparatus for converting a field frequency of an input picture signal in the relation of M and N (where M≠N; M and N are any natural numbers), comprising:

a class deciding portion for deciding a class for a considered pixel according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal;

a memory portion for storing predictive information pre-obtained for each class;

a predictive pixel selecting portion for selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal;

a mode deciding portion for deciding a mode of a field of the output picture signal at least based upon vertical positions of pixels of a chronologically most adjacent field of the input picture signal with respect to that of the field of the output picture signal; and a pixel generating portion for generating each considered pixel of the output picture signal according to predictive information corresponding to the class decided by said class deciding portion and the mode decided by said mode deciding portion, and the plurality of pixels selected by said predictive pixel selecting portion.

16. A picture signal converting method for converting a field frequency of an input picture signal in the relation of M and N (where M≠N; M and N are any natural numbers), comprising the steps of:

deciding a class for a considered pixel according to a plurality of pixels of the input picture signal, the plurality of pixels being decided according to the considered pixel in a considered field of an output picture signal, the plurality of pixels containing at least a pixel of a field of the input picture signal, the field being placed most chronologically adjacent to the considered field of the output picture signal;

storing predictive information pre-obtained for each class;

selecting a plurality of pixels of the input picture signal, the plurality of pixels being decided according to the considered pixel in a considered field of the output picture signal, the plurality of pixels containing at least a pixel of a field of the input picture signal, the field being placed most chronologically adjacent to the considered field of the output picture signal;

deciding a mode of a field of the output picture signal at least based upon vertical positions of pixels of a chronologically most adjacent field of the input picture signal with respect to that of the field of the output picture signal; and generating each considered pixel of the output picture signal according to predictive information corresponding to the decided class and the decided mode, and the selected plurality of pixels.

* * * * *